United States Patent

[11] 3,593,287

[72] Inventors Hirao Kobayashi;
Kazuo Kiji; Yoshiyasu Kikuchi, all of
Tokyo, Japan
[21] Appl. No. 814,408
[22] Filed Apr. 8, 1969
[45] Patented July 13, 1971
[73] Assignee Nippon Electric Company, Limited
Tokyo, Japan
[32] Priority Apr. 18, 1968
[33] Japan
[31] 43/26463

[54] OPTICAL CHARACTER READER EMBODYING DETECTED VERTICAL STROKE RELOCATION
26 Claims, 11 Drawing Figs.

Figure 1:
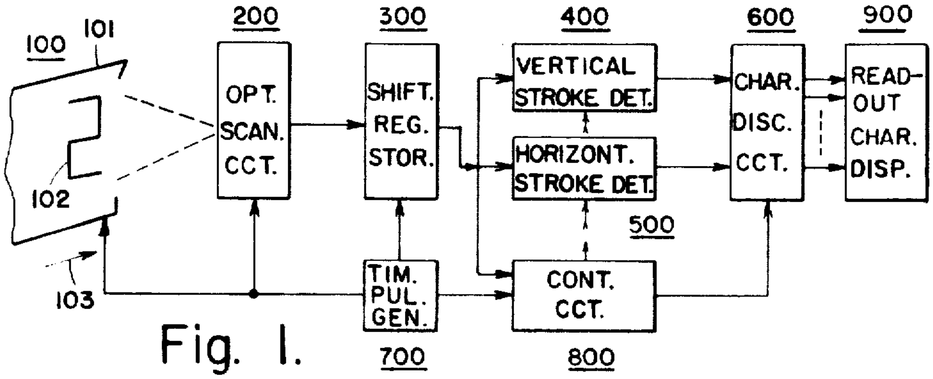

[52] U.S. Cl. ....... 340/146.3 J
[51] Int. Cl. ....... G06k 9/12
[50] Field of Search ....... 340/146.3

[56] References Cited
UNITED STATES PATENTS

| | | | |
|---|---|---|---|
| 3,245,037 | 4/1966 | Brust et al. | 340/146.3 |
| 3,295,105 | 12/1966 | Gray et al. | 340/146.3 |
| 3,305,835 | 2/1967 | Beltz | 340/146.3 |
| 3,328,760 | 6/1967 | Beltz | 340/146.3 |
| 3,430,198 | 2/1969 | Gattner et al. | 340/146.3 |

*Primary Examiner*—Maynard R. Wilbur
*Assistant Examiner*—Leo H. Boudreau
*Attorney*—Marn and Jangarathis ABSTRACT: Apparatus for optically scanning a character having vertical and horizontal strokes formed as a dark area superposed on a white area in one plane for providing "1" and "0" signals to represent dark and white segments, respectively; shift registers activated by the "1" and "0" signals for storing signals representing the vertical strokes; flip-flops activated by the "1" and "0" signals for storing signals representing the horizontal strokes; control circuits synchronized with the character scanning and responsive to certain "1" signals for providing signals to control the activation of the shift registers and flip-flops; signal discriminating circuits activated by the vertical and horizontal stroke stored signals for providing output signals indicating a recognition of the scanned character; and equipment activated by the discriminating circuits output signals for reading out the scanned character. The control circuits include a further circuit for rearranging the vertical stroke signals in the shift register to identify a "1" character, for example.

INVENTORS
Hirao Kobayashi
Kazuo Kiji
Yoshiyasu Kikuchi
BY
Marn & Jangarathis
ATTORNEYS

PATENTED JUL 13 1971 3,593,287

SHEET 2 OF 5

INVENTORS
Hirao Kobayashi
Kazuo Kiji
Yoshiyasu Kikuchi
BY
Marn & Jangarathis
ATTORNEYS INVENTORS
Hirao Kobayashi
Kazuo Kiji
Yoshiyasu Kikuchi
BY
Marn & Jangarathis
ATTORNEYS INVENTORS
Hirao Kobayashi
Kazuo Kiji
Yoshiyasu Kikuchi
BY
Marn & Jangarathis
ATTORNEYS Vertical Stroke Horizontal Stroke

| Stroke / Character | Upper Stroke | | | | | Lower Stroke | | | | | Horizontal Stroke | | |
|---|---|---|---|---|---|---|---|---|---|---|---|---|---|
| | U5 | U4 | U3 | U2 | U1 | L5 | L4 | L3 | L2 | L1 | HU | HM | HL |
| 1 | − | | + | | − | − | | + | | + | | | + |
| 2 | − | − | | | + | + | | | − | − | + | + | + |
| 3 | − | − | | | + | − | − | | | + | + | + | + |
| 4 | | + | | | + | − | | | | + | − | + | − |
| 5 | | + | | | − | − | | − | | + | + | + | + |
| 6 | + | | | − | − | + | | | | + | − | + | + |
| 7 | − | | | | + | − | | + | | − | + | | − |
| 8 | | + | | + | | + | | − | | + | | + | + |
| 9 | + | | | | + | − | − | | | + | + | + | − |
| 0 | + | | | | + | + | | | | + | + | − | + |
| ʃ | − | | + | | + | + | | + | | − | | | |
| Y | + | | − | | + | | | + | | − | − | + | − |
| d | − | − | | | + | + | | | | + | | + | + |

Truth Table

INVENTORS
Hirao Kobayashi
Kazuo Kiji
Yoshiyasu Kikuchi
BY Mann & Jangarathis
ATTORNEYS

OPTICAL CHARACTER READER EMBODYING DETECTED VERTICAL STROKE RELOCATION

This invention relates to automatic optical character reader apparatus, and more specifically to such apparatus embodying equipments for scanning a character having vertical and horizontal strokes formed as a dark area superposed on a white area to produce "1" and "0" signals representing dark and white segments, respectively, of the dark and white areas and thereafter processed to enable a readout of the scanned character.

Automatic optical character readout apparatus is heretofore known in the art. This apparatus utilizes characters printed on a suitable background and scanned in column and line directions by solar cells to produce "1" and "0" signals which are stored in shift registers. The stored signals are then processed for correlation with a reference character video pattern to select that latter pattern bearing the closest resemblance to the scanned character. Such closest pattern provides an output indicating a recognition of the initially scanned character. This type of apparatus is disclosed in a publication entitled "Optical Character Recognition" edited by G. L. Fisher et al. and published by Spartan Books, 1962; see particularly, FIGS. 12 and 13 on Page 127 and the description pertinent thereto.

The foregoing type of correlation apparatus was subsequently replaced by an OCR-A font, particularly for numerical characters, with the approval of the International Organization for Standardization (ISO). The font apparatus is greatly simplified in design compared with the complexities of the character correlation apparatus. The font apparatus relies on a scanning of each character in a vertical direction only. The positions of the scanned vertical strokes are then compared with the succeeding and neighboring vertical strokes in the vertical position to identify the scanned character.

As the numerical characters to be read out by the optical character reader are mostly formed by a line printer, an automatic typewriter, or the like, it frequently happens that the characters as formed thereby are deteriorated because of an uneven pressure of a printer hammer, an overly worn inking ribbon, and the like. Regarding the printed characters, these were sometimes found to be too thick or too light in their strokes. In some instances, the weights of right-hand and left-hand character portions were different. In addition it often occurred that a character lacked a portion of the stroke or was enveloped in an excessive amount of ink. Such imperfections in the characters submitted to the known optical-character-recognition apparatus frequently resulted in incorrect recognition.

The present invention concerns an optical character recognition apparatus providing improved character recognition reliability by sensing of increased numbers of vertical and horizontal strokes, the presence and absence of the strokes, and the relative positions of the strokes.

A principal object of the invention is to provide an improved optical character recognition apparatus embodying high reliability.

Another object is to provide optical character recognition apparatus simplified in design.

An additional object is to provide optical character recognition apparatus which may be manufactured at low cost.

A further object is to provide optical character recognition apparatus capable of reading out imperfectly formed characters with improved reliability.

Still another object is to provide optical character recognition apparatus capable of recognizing poorly aligned characters.

In combination in an optical apparatus for recognizing a numerical character having vertical and horizontal strokes formed in a dark area superposed on a white background, including solar cells for scanning the character to provide "1" and "0" signals representing dark and white areas, respectively, as the character is moved in one direction in one plane, and first shift registers for storing such signals, a specific embodiment of the invention comprises second shift registers activated by signals stored in the first shift registers for storing signals representing vertical strokes of the character as scanned, flip-flop circuits activated by signals stored in the first shift register for storing signals representing horizontal strokes of the character as scanned, control circuits responsive to signals stored in the first shift registers for producing signals to control the activation of the second shift registers and the flip-flop circuits, a clock circuit supplying timing to synchronize the activation of the solar cells, the first shift registers and the control circuits, a discriminating circuit responsive to the signals stored in the vertical stroke second shift registers and the horizontal stroke flip-flop circuits for providing output signals indicating a recognition of the scanned character, and a readout circuit activated by the discriminating circuit output signals to display the recognized character.

A brief explanation of the invention includes the following. As each character is scanned in the vertical direction from the top to the bottom thereof, the dark and white areas are converted into the aforementioned "1" and "0" signals which are then temporarily stored in the first shift registers having stages for only two vertical scanning lines. While the "1" and "0" signals are stored in the first shift registers, the vertical and horizontal strokes are detected. The mutual relationship between the thus detected strokes is determined by two timing pulse counters provided to monitor the top and bottom portions of the scanned character. Then, the spatial relationship of the vertical strokes is determined with respect to the top and bottom portions of the character. Since the bottom portion of the character is being monitored during the entire scanning cycle and as the stroke position in the immediately succeeding scanning is predicted with respect to the monitored bottom portion, the invention thereby assures the correct character reading with high reliability, regardless of such defects in the character as tend to preclude correct sensing by the solar cells during the entire scanning cycle.

A feature of the invention resides in the control circuit activated by clock timing pulses for providing a plurality of control signals in a timed sequence, including: to sense the presence of a character to be scanned, to detect the top and bottom portions of the scanned character, to define the relative regions of the top and bottom portions of the scanned character, to position the vertical strokes in the second shift registers, to rearrange the pulses in the second shift registers for certain characters such, for example, as the lower right-hand stroke in the character "1" where the detected position is in error, to synchronize the character recognition circuit with the second shift registers and the flip-flop circuits for reading out the recognized character, to reset the first and second shift registers, the flip-flop circuits and other counters at the termination of each scanning cycle; and to cause additional synchronous operations.

Figure 2:
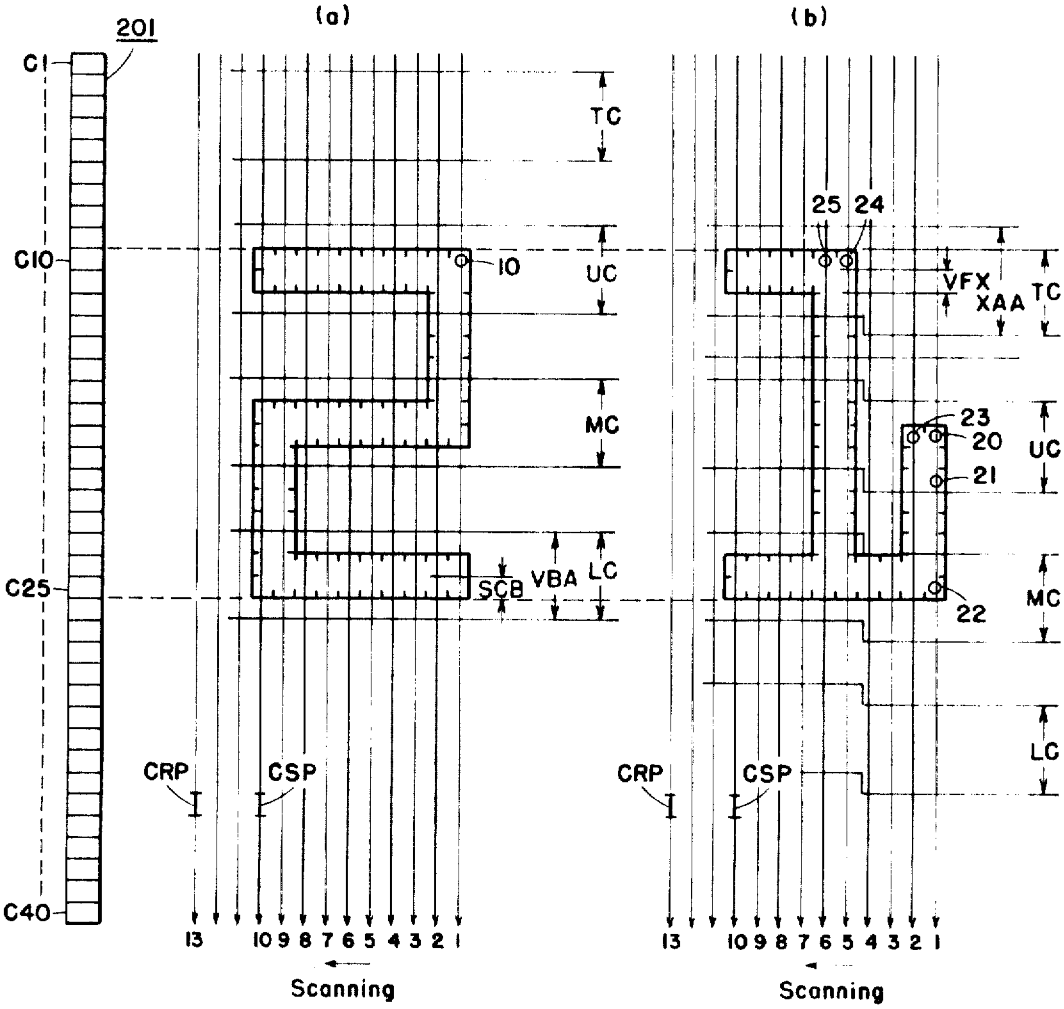
Figure 3A:
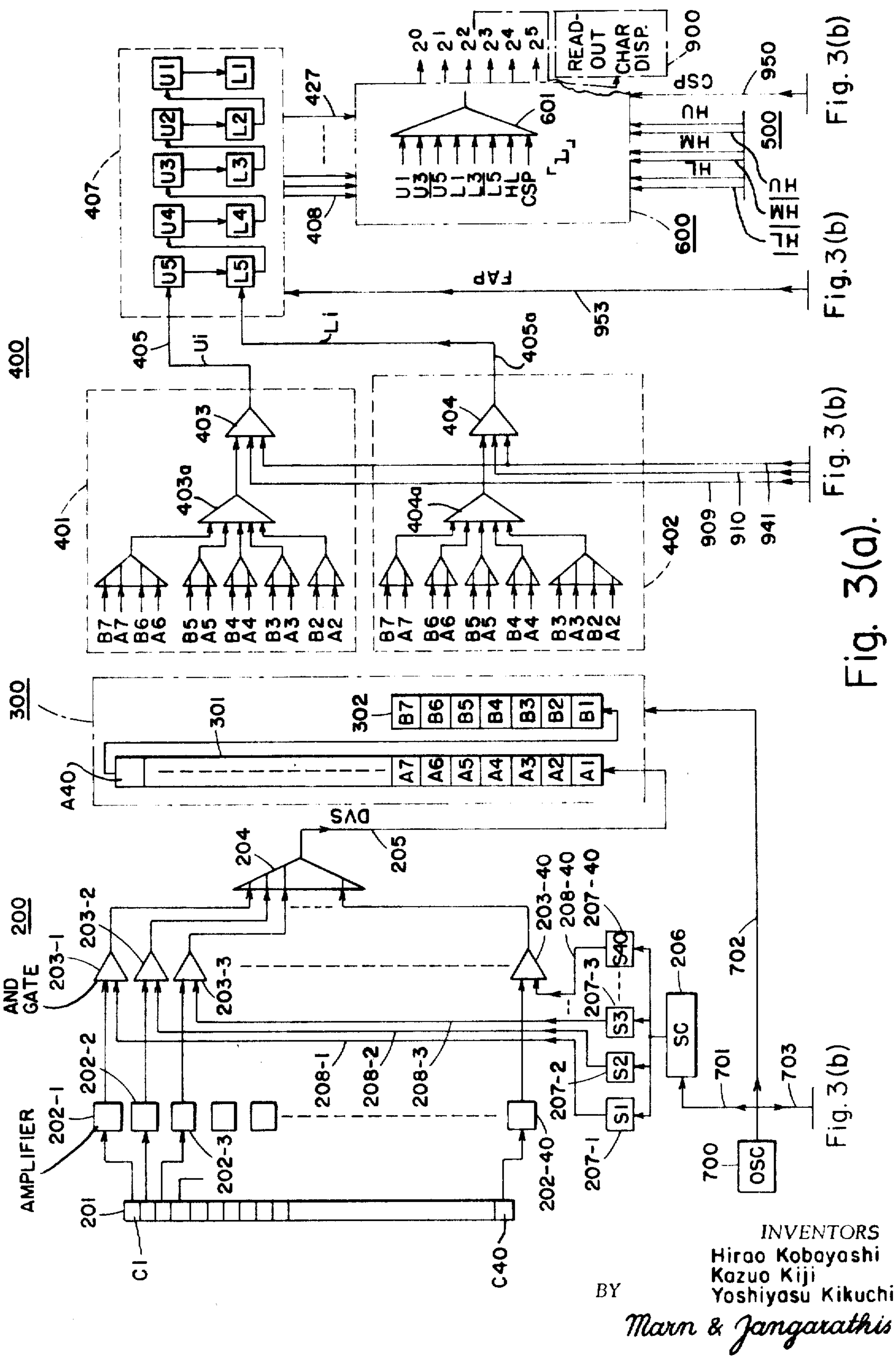
Figure 3B:
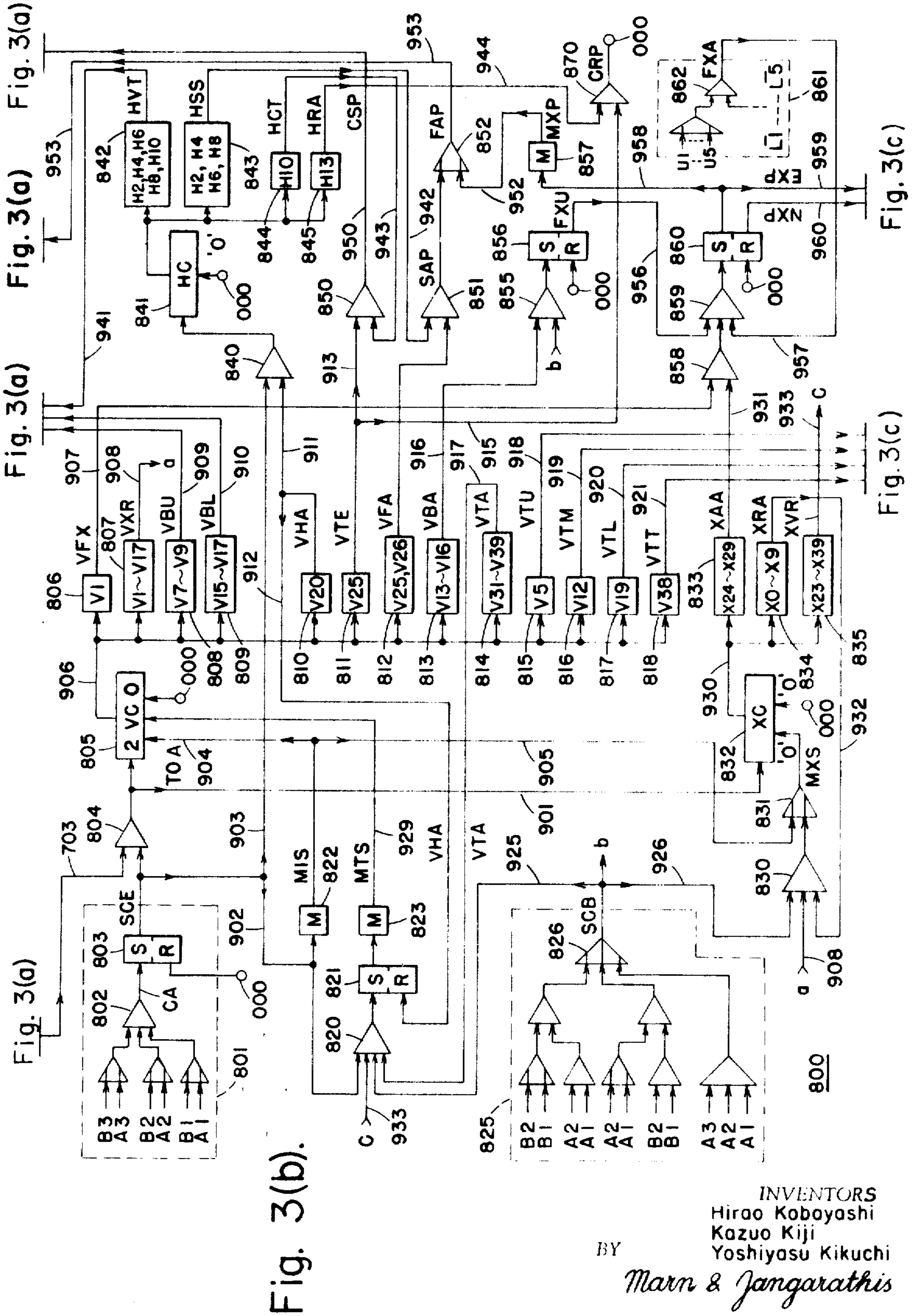
Figure 3C:
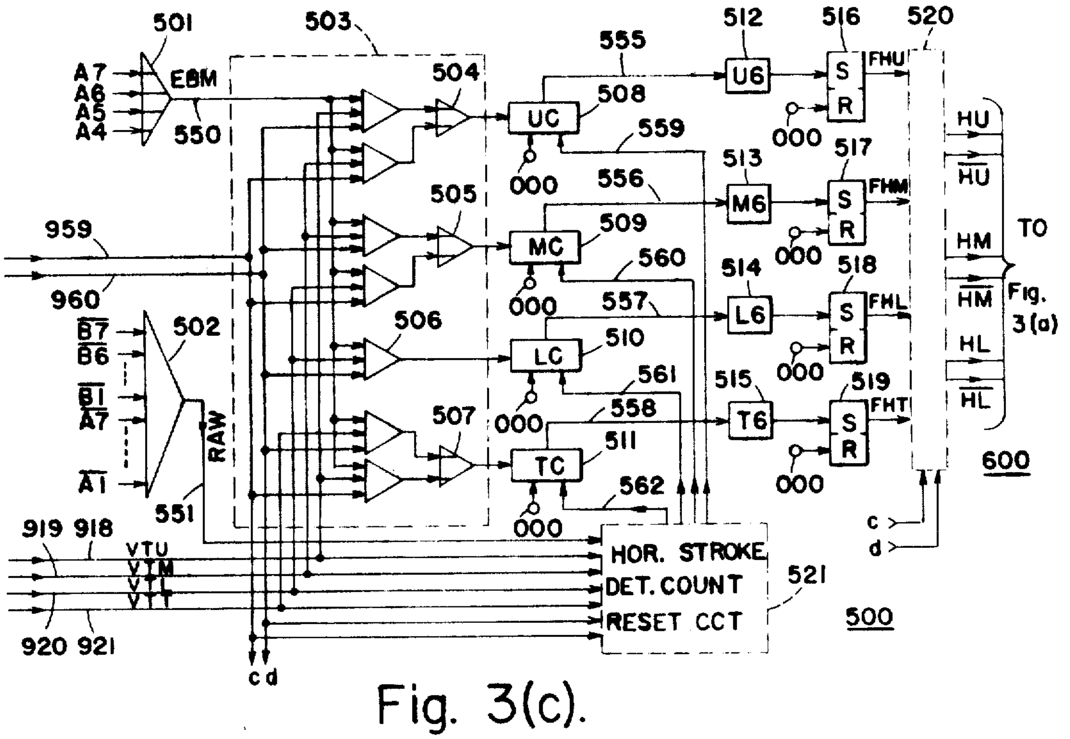
Figures 4A, 4B, 4C, 4D:
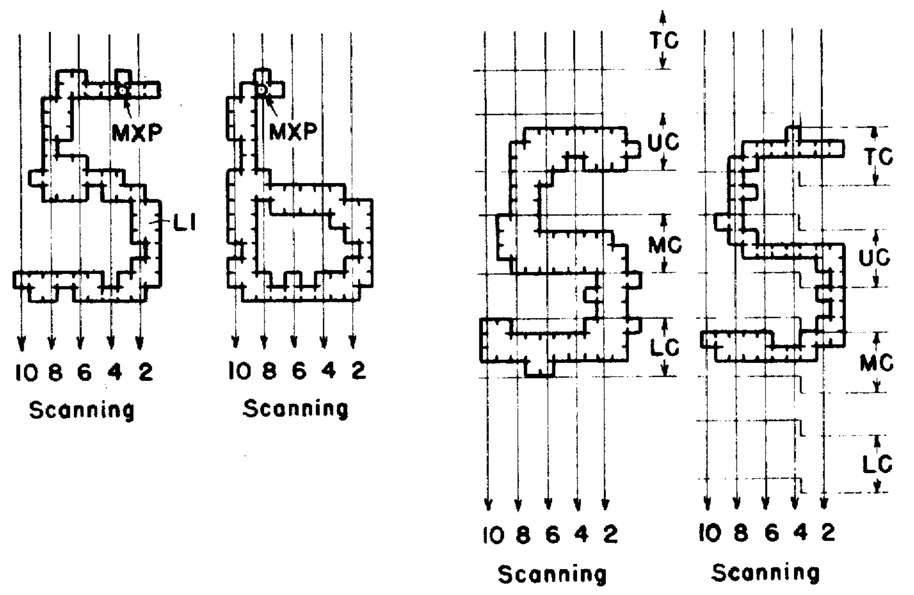
Figure 5:
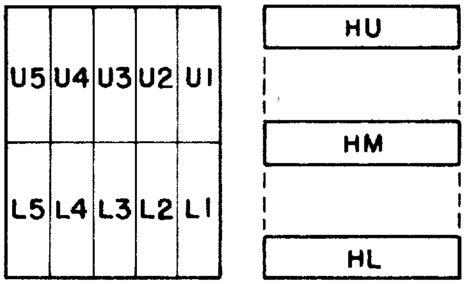

The invention is readily understood from the following description taken together with the accompanying drawing in which:

FIG. 1 is a box diagram of a specific embodiment of the invention;

FIGS. 2(*a*) and (*b*) are patterns showing how two preselected characters are read out in FIG. 1;

FIGS. 3(*a*), (*b*) and (*c*) are box diagrams of circuit components used in FIG. 1;

FIGS. 4(*a*), (*b*), (*c*) and (*d*) are patterns illustrating how characters are recognized in FIG. 1; and FIG. 5 is a table indicating action obtainable in FIGS. 3(*a*) and (*c*).

GENERAL

FIG. 1 shows a document 100 movable in a plane in a direction indicated by the arrow 103 at a constant speed for a reason later specified and including a character 102 (numerical 2) formed as a dark area superposed on a white background 101. This character is scanned by a scanning circuit 200 comprising a stack of individual solar cells further identified hereinafter for translating the document in proximity of the character into a two-level digital video signal consisting of a "1" signal to represent the dark area and a "0" signal to represent the white area. These signals are then temporarily stored in a shift register 300 which is connected to a vertical stroke detector 400, a horizontal stroke detector 500 and a control circuit 800. Outputs of the vertical and horizontal detectors are supplied to a character discriminating circuit 600 together with appropriate signals originating with the control circuit. A readout circuit 900 activated by outputs of the character discriminating circuit and a synchronizing signal supplied by the control circuit provides a display of the recognized character. A clock pulse generator 800 provides timing pulses for synchronizing the movement of the document and the operation of the scanning circuit, the shift register and the control circuit as hereinafter explained.

Character Scanning 200

FIGS. 2(*a*) and (*b*) delineate two different characters, viz, numerals 2 and 1, respectively, that are recognizable by apparatus provided in accordance with the present invention. Each character is divided into 16 vertical elements as indicated by solar cells C10...C25 included in the vertically stacked solar cell scanning device 201 including solar cells C1...C40 in scanning circuit 200 and 10 horizontal elements as shown by steps 1...10 in each scanning cycle of 13 steps. The document including numerical character-2 when moved is scanned by the receiving faces of the individual solar cells. If necessary, each character may be suitably magnified, not shown, so that the magnified vertical length thereof extends over a distance equal to 16 solar cells, i.e., solar cells C10...C25 in FIG. 2(*a*). As the document is moved in FIG. 1, the outputs of the respective solar cells are electronically scanned from cell C1 through C40 in FIG. 2 in a manner that is described below. The movement of the document and the sequential scanning of the solar cells as numerically indicated in FIGS. 2(*a*) and (*b*) serve to divide the character-2 into a matrix comprising 10×16 elements.

The outputs of the solar cells C1...C40 of stack 201 in scanning circuit 200 in FIG. 3(*a*) are amplified by the amplifiers 202–1...202–40, respectively, to the levels "1" and "0" depending on whether a dark or a white area is involved. The outputs of these amplifiers are then supplied as first inputs of respective AND gates 203–1...203–203–40. These gates receive second inputs via leads 208–1...208–40 from pulse counters (S1...S40) 207–1...207–40. Each of these counters counts down with a ratio of 40 to 1 the output of counter pulse generator (SC) 206 activated by timing pulses received on lead 701 from clock 700. As the count-down proceeds, it is obvious that the outputs are advanced from counters S1 through S40 in turn in such sense that in response to a first clock timing pulse, pulse counter (S1) 207–1 produces an output while pulse counters (S2...S40), 207–2...-207–40 produce no outputs; in response to a second clock timing pulse, pulse counter (S2) 207–2 provides an output while pulse counters (S1) 207–1 and (S3...S40) 207–3...207–40 produce no outputs; and so on until pulse counter (S40) 207–40 produces an output while pulse counters (S1...S39) 207–1...207–39 produce no outputs.

It is thus clear that AND gates 203–1...203–40 are opened in turn in response to the successive outputs of the counters (S1—S40) 207–1...207–40 to convert the outputs of amplifiers 202–1...202–40 to a time-series two-level digital video signal DVS ("1" or "0" as previously noted) on output lead 205 of OR gate 204.

Shift Registers 300

Shift register 300 (FIG. 3(*a*)) comprises 47 stages including stages A1...A40 forming a first column 301 and seven stages consisting of B1...B7 constituting a second column 302 The DVS signal in the output of OR gate 204 is initially supplied to shift register stage A1 and is thereafter shifted through succeeding stages A2...A40, B1...B7 by clock timing pulses received on lead 702 from clock 700 which is a frequency controlled oscillator for the purpose which this explanation.

Detection of Vertical Strokes 400

Vertical stroke detector 400 (FIG. 3(*a*)) comprises a first circuit 401 for detecting the vertical strokes in the upper half of the scanned character-2, a second circuit 402 for detecting the vertical strokes in the lower-half of the scanned character-2, and a vertical stroke shift register 407 for storing the detected vertical strokes. The first detecting circuit 401 comprises five OR gates of which certain ones have inputs derived from stages A2...A7 of shift register column 301 and from stages B2...B7 of shift register column 302. The outputs of the latter OR gates provide inputs for AND gate 403*a* whose single output is supplied as one input to AND gate 403 which has two additional inputs connected to leads 909 and 941 originating in the control circuit 800 in FIG. 3(*b*). Similarly, the second detecting circuit 402 includes five OR gates of which certain ones have inputs taken from stages A2...A7 of shift register column 301 and stages B2...B7 of shift register column 302. The outputs of the latter OR gates supply inputs to AND gate 404*a* providing a single input to AND gate 404 which has two further inputs joined to leads 910 and 941 extending from the control circuit 800 in FIG. 3(*b*). The outputs of AND gates 404 and 403 are transmitted on leads 405*a* and 405 to stages L5...L1 and U5...U1, respectively, of vertical stroke shift register 407. It is seen that alternate stages of U5...U1 and L5...L1 are connected in series for a purpose that is later mentioned.

The signal $Ui$($i$=1,2,3,4 or 5) derived from the output of AND gate 403 is expressed in the equation $$Ui=(A2+B2)(A3+B3)(A4+B4)(A5+B5)(A6+B6+A7+B7)\cdot VBU\cdot HVT \qquad (1)$$

where the terms $VBU$ and $HVT$ originating in the control circuit 800 are further discussed hereinafter.

Also, signal $Li$($i$=1,2,3,4 or 5) taken from the output of AND gate 404 is expressed in the equation $$Li=(A2+B2+A3+B3)(A4+B4)(A5+B5)(A6+B6)(A7+B7)\cdot VBL\cdot HVT \qquad (2)$$

where the term $VBL$ instituted in control circuit 800 is described below.

It is seen that the signal U*i* is shifted from stage U5 through stage L*i* while the signal L*i* is shifted from stage L5 through stages U4 through L1 in response to successive signals FAP on lead 953 originating in control circuit 800 in FIG. 3(*b*) for the purpose of detecting the vertical strokes of the scanned character on the document 100 in FIG. 1 as explained hereinafter.

Control Circuit 800

FIG. 3(*b*) shows the control circuit for generating a variety of control signals to stimulate action in predetermined timing sequences in several of the components in FIG. 1 in a manner that is presently described. These signals include an initial character sensing signal SCE "1" produced in a circuit 801 and remaining until the character-2 on the document 100 in FIG. 1 is completely scanned whereupon the signal is terminated in preparation ior the sensing of the next succeeding character on the latter document in a manner that is pointed out below. Circuit 801 comprises three OR gates having inputs connected to stages A1...A3 and B1...B3 of columns 301 and 302, respectively, in FIG. 3(*a*) and outputs serving as inputs to AND gate 802 whose output CA sets flip-flop 803 to produce the character sensing signal SCE "1." The output signal CA of AND gate 802 is expressed in the equation $$CA=(A1+B1)(A2+B2)(A3+B3) \quad (3)$$

The signal SCE "1" thus indicates a character on the document is now available for recognition. Upon the completion of the scanning of each character a signal CRP "1" produced at output terminal 000 of AND gate 870 in FIG. 3(*b*) is applied to a corresponding terminal 000 of flip-flop 803 whereby the latter is reset to an output "0" for terminating the signal SCE "1."

The signal SCE "1" is simultaneously supplied as one input to AND gate 804 which is also receiving a second input in the form of timing signals received on lead 703 from the clock generator 700 in FIG. 3(*a*). The signal SCE "1" also serves via lead 902 to activate a multivibrator 822 which produces an output signal (MIS) "1" only while the signal SCE "1" is effective, and to provide one input to AND gate 820. The signal (MIS) "1" on lead 904 sets counter (VC) 805 to a count 2 and via lead 905 and OR gate 831 which produces an output signal (MXS) "1" to set counter (XC) 832 at a count 0. The AND gate 804 due to its two inputs as just identified produces a stepping pulse TOA which simultaneously drives the counter (VC) 805 directly and counter (XC) 832 on lead 901.

Detection of Top and Bottom Portions of a Character

Counter (VC) 805 including six flip-flops, not shown, counts down the timing pulses produced in clock generator 700 in the counting range from '0' through '39' to monitor the top portion of the character-2 on the document in FIG. 1. Counter (XC) 832 is similar in structure and function with those of counter (VC) 805 and counts down the timing pulses of clock generator 700 in the range from '0' through '39' and monitors the lower portion of the character-2 to which a count "0" corresponds. For example, in character 1 in FIG. 2(*b*), the counting number '0' signifies that counter (VC) 805 has counted the first dark mesh 20 corresponding to the top of the character. Counting numbers "1" and "2" signify that counter (VC) 805 has counted the second mesh and the third mesh 21 in FIG. 2(*b*), respectively, in sequence from the top of the character, as explained elsewhere herein. In addition, in counter (VC) 805, count number "0" corresponds to the 40th pulse in a counting from 1 as a first pulse. At the count "0," counter (VC) 805 is actuated to the reset state. The counting number "0" in counter (XC) 832 signifies that the latter has counted the meshes representing the bottom portions of the character 1 in FIG. 2(*b*) as hereinafter stated. These two counters monitor top and bottom portions of a character "1," c for example, shown in FIG. 2(*b*) in the following manner. The vertical scanning stage 1 in FIG. 2(*b*) produces a DVS signal "1" representing a dark mesh 20 (down from solar cell C10 toward solar cell C25) which is equivalent to a DVS signal "1" representing a dark mesh 10 in FIG. 2(*a*).

The signal "1" representing the dark mesh 20 and stored in shift register stage A3 in column 301 in FIG. 3(*a*) serves to stimulate character sensing circuit 801 to produce the output signal (SCE) "1" which drives the multivibrator (M) 822 to generate output signal (MIS) "1." The latter signal sets counter (VC) 805 to a count "2" and counter (XC) 832 to a count "0." In other words, when a DVS signal representing dark mesh 21 is sensed from shift register stage A3, counter (VC) 805 is set in count state-2 and counter (XC) 832 is set in count state-0. Once the latter two counters are set at the respective counts "2" and "0," the signal MIS is not generated again until the next succeeding scanning of another character on the document in FIG. 1. Therefore, dark mesh 23 in vertical scanning stage 2 in FIG. 2(*b*) corresponds to the count "0" in counter (VC) 805, the latter count remaining until scanning stage 4 in FIG. 2(*b*).

The counter (XC) 832 is held at the count "0" by signal MXS until dark mesh 21 is sensed by stage A1 in shift register column 301. It is noted that AND gate 830 has three inputs, viz, (1) an output signal SCB on lead 926 derived in the output of OR gate 826 of a logic circuit 825 and expressed in the equation $$SCB=(A1\cdot A2)(B1+B2)+(B1\cdot B2)(A1+A2)+)(A1\cdot A2\cdot A3 \quad (4)$$

(2) an output signal VXR on lead 908 at terminal *a* as taken from output terminal *a* of decoder 807 which produces a signal "1" when counter (VC) 805 is in the count state 1 through 17; and (3) an output signal XRA on lead 932 from decoder 834 which provides a signal "1" when the counter (XC) 832 is in the count state 0 through 9. It is thus evident that AND gate 830 produces an output signal "1" when the three inputs thereto as just identified are signals "1" at the same time.

The signal VXR defines a region in which the bottom portion of the character "1" of FIG. 2(*b*) appears with respect to the top portion thereof. The signal XRA defines a further lower region in which the bottom portion of the character "1" appears. The signal "1" produced in the output of AND gate 830 activates OR gate 831 to produce an output signal "1" for holding counter (XC) 832 in the count state "0." Then, the OR gate 831 is kept activated to produce output signal "0" while the counter (XC) 832 keeps counting the pulses TOA in the output of AND gate 804. The count "0" of counter (VC) 805, however, remains the same as that of dark mesh 20 up to the vertical scanning line 4 in FIG. 2(*b*). The actual or real top portion of the character "1" in FIG. 2(*b*) is a position corresponding to dark mesh 24 in vertical scanning line as shown in FIG. 2(*b*).

A multivibrator (M) 823 is provided for adjusting the top portion detection of the character "1" by way of providing an output signal (MTS) "1" on lead 929 to change the count in counter (VC) 805. For this purpose, AND gate 820 receives four simultaneous input signals "1," viz: (1) signal SCE on lead 902 from the output of flip-flop 803; (2) the signal XVR on lead 933 at the output terminal *c* of decoder 835 which continuously produces an output signal "1" in the counting range 23 through 39 of counter (XC) 832; (3) signal SCB on lead 925 from the output of logic circuit 825; and (4) a signal VTA on lead 917 from the output of decoder 814 which continuously produces an output signal "1" in the counting range 31 through 39 of counter (VC) 805. The output signal "1" of AND gate 820 sets flip-flop 821 whose output signal "1" activates the multivibrator (M) 823 which provides the signal (MTS) "1" on lead 929 as just mentioned.

The signal XVR defines a region in which the top portion of the character "1" appears with respect to the bottom portion thereof as sensed in the immediately following scanning, whereas the signal VTA defines a region which includes the top portion of the character and which is higher than the top portion sensed in the immediately preceding scanning. The dark mesh 25 sensed in vertical scanning line 6 in FIG. 2(*b*) corresponds to a count "0" in counter (VC) 805 which produces an output signal "0" at the top portion of the character "1" while the counter (XC) 832 produces an output signal "0" at the bottom portion of the latter character. At the time point when one scanning from the bottom to the top of the character in FIG. 2(*b*) is completed, or in other words when the counter (VC) 805 is at a count "20," counter (V20) 810 generates an output signal "1" on lead 911 to reset flip-flop 821. This deactivates multivibrator (M) 823 which thereupon terminates the signal "1" in the output thereof.

A counter (HC) 841 provided for sensing the number of vertical scanning lines in FIG. 2(*b*) has an input coupled to the output of AND gate 840 whose two simultaneous inputs "1" comprise signal SCE on lead 903 from the output of character sensing circuit 801 and signal VHA on lead 911 from the output of counter (V20) 810. Upon the sensing of a character to be recognized in FIG. 1, AND gate 840 produces an output signal "1" for each scanning line to advance the count in counter (HC) 841 which is effective in the range of 1 through 13 shown in FIG. 2(*b*). The output of counter (HC) 841 is supplied the inputs of decoders 842, 843, 844 and 845 for a purpose that is mentioned later.

Positioning of Vertical Strokes

Stroke detection timing signal VBU mentioned above in above equation (1) is the output of counter 808 which provides an output "1" when the counter (VC) 805 is in the counting range 7—9. Stroke detection timing signal VBL included in foregoing equation (2) is the output of counter 809 which produces an output "1" when the counter (VC) 805 is in the counting range 15—17. Timing signal HVT in equations (1) and (2) is the output of counter 842 which provides an output "1" when counter 841 is at each of the counts 2, 4, 6, 8 and 10. As previously pointed out AND gates 403 and 404 in FIG. 3(*a*) provide outputs "1" in response to the signal HVT received thereat on lead 941. It is thus evident in FIGS. 2(*a*) and (*b*) that the signal HVT is produced one for each two successive scannings because two such scannings are performed for the width of each vertical stroke.

The vertical strokes detected for each two successive scannings as just mentioned are stored in vertical stroke shift register 407 in which the position of the stroke depends upon the number of pulses contained in the signal FAP on lead 953 as derived from OR gate 852 in FIG. 3(*b*). The latter gate is activated by input signals SAP and MXP. The signal SAP is the output "1" of AND gate 851 which is actuated by a first signal VFA taken from the output of counter 812 which provides an output "1" when the counter (VC) 805 is at each of the counts 25 and 26, and a second signal HSS taken from the output of counter 843 which provides one output "1" when the counter 841 is at each of the respective counts 2, 4, 6 and 8. During the time period of scanning each character, i.e., the "1" in FIG. 2(*b*), for example, AND gate 851 produces eight output pulses comprising the two output pulses of decoder 812 multiplied by the four output pulses at decoder 843. Signal pulse MXP supplied on lead 952 is the output "1" of multivibrator (M) 857, and referred to hereinafter as a stroke-position rearranging pulse. As previously stated, the positioning of the vertical strokes in the vertical stroke shift register 407 is determined by the number of pulses contained in the signal FAP. In the case of the numeral "1," for example, in FIG. 2(*b*), the signal FAP provides nine pulses because a ninth pulse MXP is generated due to the lower right-hand vertical stroke in the latter numeral whereas the signal FAP provides eight pulses for the numeral "2" in FIG. 2(*a*) because the signal MXP is not required.

Stroke Position Exchange Pulse

The stroke-position rearranging signal pulse MXP changes the positions of the strokes stored in the vertical stroke shift register 407 so as to rearrange the relative positions of the vertical strokes whose relative positions are detected incorrectly. For example, this is done for the numerical character "1" in FIG. 2(*b*) which has a vertical stroke of half-height at the slower right-hand section thereof. In other words, when the count of counter (VC) 805 for monitoring the upper portion of a character is greatly changed during scanning, the signal MXP is generated. That is to say, the fifth scanning operation of character "1" 2(*b*) triggers multivibrator 823 to produce pulse MTS for greatly changing the contents of pulse counter (VC) 805. In other words, in the fifth scanning operation, the contents of pulse counter (VC) 805, counting the timing pulses step-by-step, are quickly restored to a "1" state in response to the pulse MTS for correctly monitoring the upper portion of character "1" in FIG. 2(*b*). More specifically, counter (VC) 805 is quickly actuated to count "1" at mesh VFX in FIG. 2(*b*) as hereinbefore explained. This applies to the additional characters 5, 6 and 8 but not to the other characters mentioned in FIG. 5. The reason for this signal is now explained.

It is apparent from the foregoing explanation that the lower right-hand stroke of the character "1" is detected in the upper-half stroke detector 401 and is so stored in the upper vertical stroke shift register 407. This would eventually cause an erroneous recognition unless proper and appropriate rearrangement of the stored strokes in vertical stroke shift register 407 is made. In order to sense a correct recognition of the character, the pertinent vertical stroke is relocated from an upper right-hand stroke position to a lower right-hand stroke position in shift register 407. Therefore, the present invention senses the upper right-hand edges of the scanned characters even if in error, accompanied with the subsequent objective of providing a correct rearrangement of the vertical strokes to obviate the error in a manner presently explained.

AND gate 859 in FIG. 3(*b*) has three inputs, viz: (1) an inhibit signal FXU on lead 956 as taken from the reset output of flip-flop 856 when the scanned character in the group above mentioned requires no stroke position rearrangement, (2) an output of AND gate 858, and (3) a signal FXA on lead 957 from the output of logic circuit 861 which detects the arrangement of the stroke indications stored in vertical stroke register 407. The signal FXU is a logic "1" when a pulse is applied to the terminal 000 from the output of AND gate 870 and is a logic "0" when the output of AND gate 855 is a logic "1" to set flip-flop 856. The latter AND gate is activated by two inputs of which one is a signal VBA on lead 916 from the output of counter 813 which provides an output "1" during the count 13—16 of counter (VC) 805 as indicated in FIG. 2( *a*), and the other is a signal at terminal *b* corresponding to a signal SCB at terminal *b* in the output of logic circuit 825. The signal VBA provides the information of predicting a region in which the bottom potion of a scanned character appears with respect to the top portion thereof as indicated in FIG. 2(*a*). It is thus seen in FIG. 2(*a*) that the signal SCB is produced within the time range of the occurrence of the signal VBA.

AND gate 855 produces an output "1" to set flip-flop 856 whereby the signal FXU is made a logic "0" to function as an inhibit signal to close AND gate 859. The output of AND gate 858 is a logic product of signals VFX and XAA, the former being the output signal of a counter 806 on lead 907 and the latter being the output signal of counter 833 on lead 931. The signal XAA defines a region in which the top portion of the character appears with respect to the bottom portion thereof in the immediately succeeding scanning as shown in FIG. 2(*b*). It is thus seen that the signal VFX produced by counter 806 when the counter (VC) 805 is in the state of count-1 is a logic "1" when the position immediately below the top mesh is being scanned. It is therefore apparent that the output of AND gate 858 is a logic "1" at the point in time when the scanning is at a mesh immediately below mesh 24 in scanning line 5 in FIG. 2(*b*).

The signal FXA an input of AND gate 859 is expressed by the equation $$FXA=(U1+U2+U3+U4+U5)(\overline{L1}\cdot\overline{L2}\cdot\overline{L3}\cdot\overline{L4}\cdot\overline{L5}) \quad (5)$$

As is evident in equation (5), in order for the signal FXA to be a logic "1," at least one or more vertical stroke detection signals must be stored in one of the five upper register stages $U5 \ldots U1$ of the vertical stroke register 407 while at the same time none of the five lower register stages $L5 \ldots L1$ contains a vertical stroke detection signal. Characters 1, 2, 5, 6, 7, 8, S and Y in FIG. 5 require the signal FXA to be a logic "1" in the course of the scanning thereof. Also, characters 1, 5, 6 and 8 require AND gate 859 to provide an output "1." It is thus seen in each of the latter four characters that the stroke in the lower right-hand section is detected by the upper vertical stroke detector 401 in FIG. 3(*a*) and is erroneously stored in one of the upper stages $U5 \ldots U1$ of vertical stroke register 407. In order to obviate such error, AND gate 859 produces the output "1" to set flip-flop 860 which produces an output "1" on lead 958 to activate the multivibrator 857 to generate the stroker rearranging pulse MXP as a logic "1" for the purpose previously explained. Each one of the eight pulses SAP in the output of AND gate 851 is generated every time two scanning operations are completed. Moreover, upper and lower vertical strokes U*i* and V*i* signals are produced in the outputs of AND gates 403 and 404, respectively, every two scanning operations and then stored via signal lines 405 and 405*a* in stages U5 and L5 in register 407. Each of the sequential eight pulses SAP effective on lead 953 causes the contents of register stages U5 and L5 to shift step-by-step (one stage at a time) as shown by the respective arrowheads in register 407. On the other hand, pulse MXP serves to reverse upper and lower vertical strokes. More particularly, in character "1" in FIG. 2(*b*), for example, the strokes from mesh 20 to mesh 22 are identified as upper strokes by counter (VC) 805. As a consequence of this, pulse MXP is produced via the outputs of AND gate 859 and vibrator 857 in sequence to change the last-mentioned upper strokes to lower strokes. Hence, pulse MXP is applied through OR gate 852 as a pulse FAP to register 407 when the mesh in VFX in FIG. 2(*b*) is scanned in the fifth scanning operation. Thereof, data contents of stages L3 to U5 in register 407, stored therein until the completion of the fourth scanning operation, are moved by one stage, i.e., the contents of stage L3 is moved to stage U2,...stage U5 to stage L5. The remaining four of the eight pulses FAP cause such stored contents of U5 to L5 to shift by four stages, i.e., the content of stage L3 is moved to stage L1,..., and L5 to L3. It is recalled from the previous description that stages L5...L1 are empty at this time. As a consequence, stroke rearranging pulse MXP serves to provide an accurate recognition of character "1" FIG. 2(*b*) as hereinbefore described in detail. The time for the generation of stroke rearranging pulse MXP is shown in FIGS. 4(*a*) and (*b*).

Detection of Horizontal Strokes 500

FIG. 3(*c*) delineates a horizontal detection circuit 500 comprising four pulse counters 508...511 for detecting horizontal strokes at the upper, middle and lower sections of a scanned character; an OR gate 501 connected to stages A4...A7 of a first shift register column 301 in FIG. 3(*a*) and providing on lead 550 an output signal EBM which is a logic "1" when one or more of the latter shift register stages is a logic "1"; and a switching circuit 503 including AND gates 503*a*, *b*, *c*, *d*, *e* and *f* and AND gate 506, and OR gates 504, 505 and 507. The outputs of OR gates 504 and 505, AND gate 506, and OR gate 507 are connected to inputs of pulse counters 508(UC), 509(MC), 510(LC), and 511(TC), respectively. Signals EXP and NXP on leads 959 and 960 as derived from flip-flop 860 in FIG. 3(*b*) are supplied as inputs to the gates 504...507. Signals VTU, VTM, VTL and VTT on leads 918, 919, 920 and 921 as derived from counters 815(V5), 816(V12), 817(V19) and 818(V38), respectively, in FIG. 3(*b*) are also supplied as inputs to switching circuit 503 and horizontal stroke detection counter reset circuit 521. The outputs of counters 815, 816, 817 and 818 are a logic "1" when the counts of counter (VC) 805 are 5, 12, 19 and 38, respectively.

The switching circuit 503 serves to transfer inputs to the counters 508...511 in accordance with the following equations:

Output of OR gate 504$=EBM \cdot NXP \cdot VTU + EMB \cdot EXP \cdot VTM$ (6)

Output of OR gate 505$=EBM \cdot NXP \cdot VTM + EBM \cdot EXP \cdot VTL$ (7)

Output of AND gate 506$=EBM \cdot NXP \cdot VTL$ (8)

and

Output of OR gate 507$=EBM \cdot NXP \cdot VTT + EBM \cdot EXP \cdot VTU$ (9)

Counter (UC) 508 detects the upper horizontal stroke of a character being scanned at a given moment; counter (MC) 509 detects a middle horizontal stroke; counter 510(LC) detects a lower horizontal stroke; and counter (TC) 511 detects the upper horizontal stroke of a character-5 shown in FIG. 4(*d*) when the latter is finely quantized. Each of the counters 508...511 is advanced when the corresponding signal among output signals VTU, VTM, VTL and VTT derived from counters 815...818, respectively, is a logic "1." FIGS. 2(*a*) and (*b*) and 4(*c*) and (*d*) indicate the areas of a scanned character where the respective horizontal strokes TC, UC, MC and LC are detected. Each of counters 508...511 comprises three flip-flops, not shown, for providing a count from 1 through 6. The outputs of counters 508...511 are supplied via leads 555, 556, 557 and 558 to the inputs of other counters 512, 513, 514 and 515, respectively. Each of the latter counters provides an output "1," when the counter connected to its input attains a 6-count, to set the corresponding one of flip-flops 516, 517, 518 and 519 to provide an output "1" identified as one of FHU, FHM, FHL and FHT output signals.

The above-noted 6-count is 0 reference value indicating the presence of a horizontal stroke when six or more dark meshes are detected in the horizontal direction. FIGS. 4(*c*) and (*d*) illustrate the same strokes may be detected by different counters. In order to ensure that the horizontal stroke detection signals of correct upper (UC), middle (MC) and lower (LC) sections are applied to the character discriminating circuit 600 in FIG. 1, there is provided a switching circuit 520 which is adapted in a manner not shown but familiar to the art to satisfy the following equations:

Upper horizontal stroke $HU = NXP \cdot FHU + EXP \cdot FHI$ (10)

Middle horizontal stroke $HM = NXP \cdot FHM + EXP \cdot FHU$ (11)

Lower horizontal stroke $HL = NXP \cdot FHL + EXP \cdot FHM$ (12)

$\overline{HU} = \overline{\text{Eq.(10)}}$ (13)

$\overline{HM} = \overline{\text{Eq.(11)}}$ (14)

$\overline{HL} = \overline{\text{Eq.(12)}}$ (15)

It is noted that the circuit 520 also receives two inputs *c* and *d* taken from leads 959 and 960, respectively. As it is apparent from equations (6)...(15), the horizontal strokes are sensed by the state of flip-flop 860 in FIG. 3(*b*) at a given time. It is thus evident that the counters in the horizontal stroke sensing state are changed depending upon the presence or absence of the stroke-position rearranging pulse MXP.

A horizontal stroke detection counter reset circuit 521 resets the horizontal stroke detection counters 508...511 so as not to detect incorrectly a vertical stroke as a horizontal one. This circuit is supplied with three types of inputs, viz: (1) the signal RAW derived from the output of AND gate 502 when the outputs of all shift register stages in columns 301 and 302 in FIG. 3(*a*) are a logic "0"; (2) the signals VTU, VTM, VTL and VTT derived in FIG. 3(*b*) as mentioned above; and (3) the signals EXP and NXP derived in FIG. 3(*b*) as previously explained. The reset circuit 521 is adapted, not shown, to satisfy the following equations:

Reset signal for counter $(UC)$–508$= NXP \cdot RAW \cdot VTU + EXP \cdot RAW \cdot VIL$ (16)

Reset signal for counter $(MC)$–509$= NXP \cdot RAW \cdot VTM + EXP \cdot RAW \cdot VTL$ (17)

Reset signal for counter $(LC)$–510$= NXP \cdot RAW \cdot VTL$ (18)

Reset signal for counter $(TC)$–511$= NXP \cdot RAW \cdot VTT + EXP \cdot RAW \cdot VTU$ (19)

The reset signals "1" expressed by equations (16)...(19) are supplied on leads 559, 560, 561 and 562 to reset counters 508, 509, 510 and 511, respectively, to the counting state "0."

Discrimination and Recognition of Characters

FIG. 3(*a*) shows a discrimination circuit 600 for recognizing an input or scanned character as a combination of the contents of vertical stroke register 407 on its output leads 408...427; the contents of horizontal stroke register 500 on its output leads $\overline{HL}$, HL, $\overline{HM}$, HM, $\overline{HU}$ and HU; and a character recognition synchronizing pulse CSP effective on lead 950. The discrimination circuit 600 produces 6-bit parallel binary signals representing the signal combination just identified. AND gate 601 is adapted to recognize the character "1" as follows:

$$\text{"1"} = U1 \cdot U3 \cdot U5 \cdot L1 \cdot L3 \cdot L5 \cdot HL \cdot CSP \quad (20)$$

The signal CSP in the output of AND gate 850 in FIG. 3(*b*) is the logical product of the output VTE of counter 811 and of the output HCT of counter 844. The signal VTE is a logic "1" when vertical counter (VC) 805 attains a count-25 and the signal HCT is a logic "1" when horizontal counter (HC) 841 has a count-10. Therefore, the signal CSP is a logic "1" at the time indicated in FIGS. 2(*a*) and (*b*). FIG. 5 shows the truth table for the characters included therein, and includes a symbol (+) to denote the presence of a stroke, a symbol (−) the absence of a stroke, and a blank space to indicate the lack of relation to the presence of a stroke. In this connection, for example, a typical signal AB represents a logic "1" whereas a typical signal $\overline{AB}$ indicates a logic "0."

Supplementary

All terminals 000 in FIGS. 3(*b*) and (*c*) are connected to output terminal 000 of AND gate 870 in FIG. 3(*b*) which provides an output signal CRP "1" to indicate the completion of the scanning of one character in FIG. 1 by resetting all circuits connected to the latter AND gate to the initial starting state to await the commencement of the next succeeding scanning cycle. AND gate 870 receives one input HRA via lead 944 from the output of counter 845 and a second input VTE on lead 915 from the output of counter 811. The output signal CRP is made a logic "1" at the time period indicated with the corresponding marking in FIGS. 2(*a*) and (*b*).

It is understood that the solar cells and amplifiers constituting scanning circuit 200 in FIGS. 1 and 3(*a*) may be replaced with any suitable equipment capable of performing the function of providing two level digital video signals DVS comprising logic "1" and "0." A flying spot scanner (FSS), not shown, presently known in the art is one example of such replacement. It is apparent that when the characters to be scanned are formed with magnetic ink, a scanning device utilizing magnetic heads can serve as another replacement.

As previously mentioned, counter (VC) 805 includes a count-0 corresponding to the top portion of the scanned character and counter (XC) 832 contains a count-0 corresponding to the bottom portion of the scanned character. For this reason, a mutual relation of the vertical strokes constituting the scanned character is easily and correctly sensed with respect to the top and bottom portions of the sensed character strokes. More particularly, in the case of the low quality character-5 in FIG. 4(*a*), the lower right-hand stroke L1 is possibly detected at first as the upper vertical stroke U1. However, such incorrectly detected stroke U1 is rearranged to the strike L1 under control of the stroke rearranging pulse MXP as previously explained. This also applies to the character-6 in FIG. 4(*b*).

In contrast to the characters in FIGS. 4(*a*) and (*b*) as just mentioned, character-5 in FIG. 4(*c*) formed with excessive ink does not require the production of the rearranging pulse MXP in order to read out the stroke L1 from the beginning as a stroke in the lower right-hand section of the latter character.

Characters having strokes formed with foreign matter or ink blots are sensed as noise by counters 807 and 835. More specifically, counter 807 produces an output "1" only when counter (VC) 805 is in the counting range 1 through 17 to supply output signal VXR via lead 908 and terminals *a* to AND gate 830 so as to define that region with respect to the top portion of the scanned character in which the bottom portion of the character is sensed. Counter 835 produces an output "1," when counter (XC) 832 is in the counting range 23—39, which is applied via lead 933 and terminals *c* to AND gate 820 to define the region in which the top portion of the character with respect to the bottom portion appears.

It is thus apparent from the foregoing explanation of the invention that the positions of the horizontal and vertical strokes of a scanned character are accurately determined with respect to the initially sensed top and bottom portions. This makes it possible to recognize characters that are imperfect and indistinct in formation.

It is understood that the invention herein is described in specific respects for the purpose of this invention, It is also understood that such respects are merely illustrative of the application of invention. Numerous other arrangements may be devised by those skilled in the art without departing from the spirit and scope of the invention.

We claim:

1. An optical reader for characters formed with vertical and horizontal dark strokes positioned in upper and lower halves thereof and enveloped in a white area, comprising:

optical means for scanning said characters in turn in a plurality of vertical steps in successive scanning cycles to provide "1" and "0" signals representing dark and white segments, respectively, of said strokes and said area;

first shift register means for storing said "1" and "0" signals;

means responsive to said "1" and "0" signals derived from said shift register means for providing output signals to indicate detection of said vertical strokes in said upper and lower halves of said characters as scanned;

second shift register means including interconnected upper and lower stages for storing therein said output signals representing said vertical strokes in said upper and lower character halves, respectively; said output signals resulting from at least first and second steps in said scanning cycles of said vertical strokes in certain of said characters being stored in said upper stages to represent correct readings of said last-mentioned strokes and said output signals resulting from at least first and second steps in said scanning cycles of vertical strokes in others of said characters being stored in said upper stages to represent faulty readings of said last-mentioned strokes;

means responsive to scanning steps subsequent to said second steps in said scanning cycles for providing stroke rearranging pulses to activate said second shift register means to transfer from said upper stages to said lower stages said output signals resulting from said first and second steps in said scanning cycles of said vertical strokes in said other characters to represent correct readings of said last-mentioned strokes thereby eliminating said faulty readings thereof; thereof:

means responsive to said "1" and "0" signals derived from said first shift register means for providing output signals to indicate detection of said horizontal strokes in said certain and other characters;

means activated by said signals stored in said upper and lower stages of said second shift register means and said horizontal stroke detecting means output signals for producing further signals to indicate recognition of said certain and other characters as scanned;

means energized by said "1" and "0" signals derived from said first shift register means for producing signals controlling the response of said vertical stroke and horizontal stroke detecting means to said "1" and "0" signals derived from said first shift register means to provide said output signals of said last-mentioned detecting means and for producing additional signals controlling said recognition means to provide said further output signals thereof;

clock means for providing timing pulses to activate said scanning means, said first shift register means and said controlling means to effect synchronization therebetween;

means included in said controlling means and responsive to said scanning means for counting said timing pulses to monitor top and bottom portions of said certain and other characters to determine mutually spatial positions of said vertical and horizontal strokes in said certain and other character recognition; and means activated by said recognition means further output signals for reproducing said certain and other characters as scanned.

2. An optical reader for characters formed with vertical and horizontal dark strokes positioned in upper and lower halves thereof and enveloped in a white area, comprising:

optical means for scanning said characters in turn in a plurality of vertical steps in successive scanning cycles to provide "1" and "0" signals representing dark and white segments, respectively, of said strokes and said area;

first shift register means for storing said "1" and "0" signals;

means responsive to said "1" and "0" signals derived from said shift register means for providing output signals to indicate detection of said vertical strokes in said upper and lower halves of said characters as scanned;

second shift register means including interconnected upper and lower stages for positioning therein said output signals representing said vertical strokes in said upper and lower character halves, respectively; said output signals resulting from at least first and second steps in said scanning cycles of said vertical strokes in certain of said characters being positioned in said upper stages to represent correct readings of said last-mentioned strokes and said output signals resulting from at least first and second steps in said scanning cycles of said vertical strokes in other of said characters being positioned in said upper stages to represent faulty readings of said last-mentioned strokes;

clock means for providing timing signals to activate said scanning means and said first shift register means to effect synchronization therebetween;

means utilizing said "1" and "0" signals derived from said first shift register means for counting said timing signals to monitor detection of top and bottom portions of said certain and other characters;

means controlled by said monitoring means for producing a signal pulse to activate said second shift register means to transfer from said upper stages to said lower stages said output signals resulting from said first and second steps in said scanning cycles for said vertical strokes of said other characters to represent correct readings of said last-mentioned strokes thereby eliminating said faulty readings thereof;

means activated by said "1" and "0" signals in said first shift register means for producing output signals to indicate detection of said horizontal strokes in said certain and other characters; and means activated by said signals stored in said upper and lower stages of said second shift register means and by said horizontal stroke detecting means output signals for reproducing said certain and other characters as scanned.

3. An optical reader for characters formed with vertical and horizontal strokes positioned in upper and lower halves thereof and enveloped in a white area, comprising:

optical means for scanning said characters in turn in a plurality of vertical steps in successive scanning cycles to provide "1" and "0" signals representing dark and white segments, respectively, of said strokes and said area;

first shift register means for storing said "1" and "0" signals;

means responsive to said "1" and "0" signals derived from said shift register means for providing output signals to indicate detection of said vertical strokes in said upper and lower halves of said characters as scanned;

second shift register means including interconnected upper and lower stages for storing therein said output signals representing said vertical strokes in said characters upper and lower halves, respectively; said output signals resulting from at least first and second steps in said scanning cycles of vertical strokes in certain of said characters being stored in said upper stages to represent correct readings of said last-mentioned strokes and said output signals resulting from at least first and second steps in said scanning cycles of vertical strokes in others of said characters being stored in said upper stages to represent faulty readings of said last-mentioned strokes;

clock means for producing timing signals to activate said scanning means and said first shift register means to effect synchronization therebetween;

control means responsive to said scanning means and said "1" and "0" signals in said first shift register means for counting said timing signals to provide signals to indicate regions in which top and bottom portions occur in said vertical and horizontal strokes of said certain and other characters as scanned;

means included in said control means for producing signals to determine the time required for said scanning of said certain and other characters from said top portions to said bottom portions thereof;

means included in said control means and responsive to scanning steps beyond said second steps for producing stroke rearranging pulses to activate said second shift register means to transfer from said upper stages to said lower stages said output signals resulting from said first and second steps in said scanning cycles of said vertical strokes in said other characters to represent correct readings of said last-mentioned strokes thereby eliminating said faulty readings thereof;

means responsive to said "1" and "0" signals derived from said first shift register means for providing output signals to indicate detection of said horizontal strokes in said certain and other characters;

means included in said control means and operative in a scanning step subsequent to said second scanning step for providing character recognition synchronizing signals; and means energized by said signals stored in said upper and lower stages of said second shift register means, said horizontal stroke detecting means output signals and said recognition synchronizing signals for reproducing said certain and other characters as scanned.

4. An optical reader for characters formed with vertical and horizontal strokes positioned in upper and lower halves thereof and enveloped in a white area, comprising:

optical means for scanning said characters in turn in a plurality of vertical steps in successive scanning cycles to provide "1" and "0" signals representing dark and white segments, respectively, of said strokes and area;

first shift register means for storing said "1" and "0" signals;

means responsive to said "1" and "0" signals derived from said shift register means for providing output signals to indicate detection of said vertical strokes in said upper and lower halves of said characters as scanned;

clock means supplying timing signals for activating said scanning means and said first shift register means to effect synchronization therebetween;

second shift register means including interconnected upper and lower stages for storing therein said output signals representing said vertical strokes in said characters upper and lower halves, respectively; said output signals resulting from at least first and second steps in said scanning cycles of vertical strokes in certain of said characters being stored in said upper stages to represent correct readings of said last-mentioned strokes and said output signals resulting from at least first and second steps in said scanning cycles of vertical strokes in others of said characters being stored in said upper stages to represent faulty readings of said last-mentioned strokes; said output signals resulting from said first and second steps in said scanning cycles of said vertical strokes in said other characters being transferred from said upper stages to said lower stages to represent correct readings of said last-mentioned strokes thereby eliminating said faulty readings thereof as said steps in said scanning cycles proceed beyond said second steps;

flip-flop means activated by said "1" and "0" signals in said first shift register means for storing output signals indicating detection of said horizontal strokes in said certain and other characters;

control means counting said timing signals for providing signals to activate said second shift register means and said flip-flop means to store said detected vertical stroke and horizontal stroke signals, respectively, therein; and means energized by said signals stored in said upper and lower stages of said second shift register means and said output signals stored in said flip-flop means for reproducing said certain and other characters as scanned.

5. An optical reader for characters formed with vertical and horizontal dark strokes positioned in upper and lower halves thereof and enveloped in a white area, comprising:

optical means 4 scanning said characters in turn in a plurality of vertical steps in successive scanning cycles to provide "1" and "0" signals representing dark and white segments, respectively, of said strokes and said area;

means responsive to said "1" and "0" signals for providing output signals to indicate detection of said vertical strokes in said upper and lower halves of said characters as scanned;

shift register means including interconnected upper and lower stages for storing therein said output signals representing said vertical strokes in said character upper and lower halves, respectively; said output signals resulting from at least first and second steps in scanning cycles of vertical strokes in certain of said characters being positioned in said upper stages to represent correct readings of said last-mentioned strokes and said output signals resulting from at least first and second steps in scanning cycles of vertical strokes in others of said characters being positioned in said upper stages to represent faulty readings of said last-mentioned strokes;

means responsive to steps beyond said second steps in said scanning cycles of said other characters for providing signal pulses to activate said shift register means to transfer from said upper stages to said lower stages said output signals resulting from said first and second steps in said scanning cycles of said vertical strokes in said other characters to represent correct readings of said last-mentioned strokes thereby eliminating said faulty readings thereof;

means responsive to said "1" and "0" signals for providing output signals to indicate detection of said horizontal strokes in said certain and other characters;

means activated by said signals positioned in said upper and lower stages of said shift register means and said horizontal stroke detecting means output signals for providing further output signals to indicate recognition of said certain and other characters as scanned;

clock means for producing timing pulses to activate said scanning means and said shift register means to effect synchronization therebetween;

means counting said timing signals for generating signals to control the response of said vertical stroke and said horizontal stroke detecting means to said "1" and "0" signals and the response of said recognition means to said signals positioned in said shift register means upper and lower stages and to said horizontal stroke detecting means output signals; and means activated by said recognition means further output signals for reproducing said certain and other characters as scanned.

6. The optical reader according to claim 5 in which said scanning means includes solar cells, each providing one of said "1" and "0" signals.

7. The optical reader according to claim 5 in which said scanning means includes shift registers for storing said "1" and "0" signals.

8. The optical reader according to claim 5 in which said dark and white areas are divided into said dark and white segments forming a rectangular matrix having *m* segments in a first direction and *n* segments in a second direction normal to said first direction; each of said dark segments represented by one of said "1" signals and each of said white segments by one of said "0" signals.

9. The optical reader according to claim 5 in which said controlling means includes means responsive to said "1" and "0" signals for generating a signal to activate said last-mentioned means to initiate action in said controlling means at the start of said character scanning.

10. The optical reader according to claim 9 in which said controlling means includes means for generating a signal to activate said start signal means to terminate said start signal after the termination of said character scanning.

11. The optical reader according to claim 5 in which said controlling means includes pulse counting means for detecting top and bottom portions of said scanned characters.

12. The optical reader according to claim 11 in which said controlling means includes means responsive to said "1" and "0" signals for generating a signal to activate said top and bottom detecting means to predetermined counting states at the start of said character scanning.

13. The optical reader according to claim 5 in which said controlling means includes means for producing a signal to define a region in which a bottom portion of each of said scanned characters appears with respect to a top portion thereof.

14. The optical reader according to claim 13 in which said controlling means includes means for producing a signal to define a further region in which said bottom portion of said scanned character appears.

15. The optical reader according to claim 5 in which said controlling means includes means for producing a signal to define a region in which a top portion of each of said scanned characters appears with respect to a bottom portion thereof.

16. The optical reader according to claim 15 in which said controlling means includes means for producing a signal to define a further region in which a second top portion of each of said scanned characters appears and which is higher than said first-mentioned top portion.

17. The optical scanner according to claim 5 in which said controlling means includes means for counting a predetermined number of vertical scanning steps in each scanning cycle from the start of said character scanning to produce a signal to activate said controlling means to terminate said last-mentioned scanning.

18. The optical reader according to claim 5 in which said horizontal stroke detecting means includes first, second and third pulse counters for detecting upper, middle and lower horizontal strokes, respectively, of each of said scanned character in response to said "1" and "0" signals derived from said scanning means and control signals supplied by said controlling means.

19. The optical reader according to claim 15 in which said horizontal stroke detecting means includes a fourth pulse counter to detect upper horizontal strokes of said other characters presented in finely quantized form while said first and second counters detect said middle and lower horizontal strokes, respectively, of said last-mentioned characters and said third pulse counter is idle as said last-mentioned characters are scanned.

20. The optical reader according to claim 19 in which each of said first, second, third and fourth counters is adapted to count up to six pulses to indicate the presence of a horizontal stroke.

21. The optical reader according to claim 20 in which said horizontal stroke detecting means includes a plurality of additional pulse counters, each connected to an output of one of said first, second, third and fourth pulse counters and adapted to provide an output "1" in response to a 6-pulse count in said respective last-mentioned counters and an output "0" in response to a count of less than six in said respective last-mentioned counters.

22. The optical reader according to claim 21 in which said horizontal stroke detecting means includes a plurality of flip-flop means, each having a set-terminal connected to an output of one of said additional counters, each of said flip-flop means responsive to a "1" signal in one of said last-mentioned outputs to move to a set state to provide an output "1" indicating a presence of one of said strokes in said scanned character and responsive to a "0" signal in one of said last-mentioned outputs to remain in said reset state to provide an output "0" indicating an absence of one of said strokes in said scanned character.

23. The optical reader according to claim 5 in which each of said upper and lower stages in said shift register means is five in number; said respective five upper and lower stages serially connected in such manner that an output of a fifth upper stage is connected to an input of a fifth lower stage, outputs of said fifth through second lower stages are connected to inputs of said respective fourth through first upper stages, and outputs of said respective fourth through first upper stages are connected to inputs of said fourth through first lower stages; and said controlling means includes means for producing a predetermined number pulses to activate said shift register means through a corresponding predetermined number of steps to position said vertical stroke detecting means output signals resulting from said first and second scanning steps in said upper stages to represent said correct and faulty readings of said last-mentioned strokes in said certain and other characters, respectively; and said signals transferred from said upper stages to said lower stages to represent said correct readings of said last-mentioned vertical strokes in said other characters.

24. The optical reader according to claim 23 in which said predetermined number of pulses is eight to activate said shift register means through eight steps to position said vertical stroke detecting means output signals resulting from said first and second scanning steps in said upper stages.

25. The optical reader according to claim 24 in which said controlling means includes means for producing one additional pulse in supplement of said predetermined eight pulses to further activate said shift register means to transfer from said upper stages to said lower stages said vertical stroke detecting means output signals resulting from said first and second scanning steps to represent said correct readings of said vertical strokes in said other characters.

26. The optical reader according to claim 23 in which said controlling means includes:

means for producing said predetermined eight pulses to activate said shift register means through said corresponding eight steps to position in said upper stage said vertical stroke detecting means output signals resulting from said first and second scanning steps to represent said correct and faulty readings of said last-mentioned strokes in said certain and other characters, respectively; and means for producing a ninth pulse in supplement of said eight pulses to further activate said shift register means to transfer from said upper stages to said lower stages said vertical stroke detecting means output signals resulting from said first and second scanning steps to represent said correct readings of said last-mentioned strokes in said other characters.

UNITED STATES PATENT OFFICE
CERTIFICATE OF CORRECTION

Patent No. 3,593,287 Dated July 13, 1971

Inventor(s) HIRAO KOBAYASHI ET AL

It is certified that error appears in the above-identified patent and that said Letters Patent are hereby corrected as shown below:

Column 12, line 34, delete "thereof", second occurrence.

Column 13, line 14, "other" should be --others--.

Column 15, line 1, "4" should be --for--.

Column 16, line 17, before "said", second occurrence, insert -- each of --;
line 18, "character" should be --characters--;

line 41, "15" should be --18--.

Column 18, line 12, "stage" should be --stages--.

Signed and sealed this 11th day of April 1972.

(SEAL)
Attest:

EDWARD M.FLETCHER,JR.
Attesting Officer

ROBERT GOTTSCHALK
Commissioner of Patents